(12) United States Patent
Takahasi (10) Patent No.: US 9,742,874 B2
(45) Date of Patent: Aug. 22, 2017

(54) CONTROL DEVICE, AND METHOD FOR TRANSFER CONTROL

(71) Applicant: FUJITSU LIMITED, Kawasaki-shi, Kanagawa (JP)

(72) Inventor: Kouitirou Takahasi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 287 days.

(21) Appl. No.: 14/250,733

(22) Filed: Apr. 11, 2014

(65) Prior Publication Data

US 2014/0222905 A1   Aug. 7, 2014

Related U.S. Application Data

(63) Continuation of application No. PCT/JP2011/073960, filed on Oct. 18, 2011.

(51) Int. Cl.
*G06F 15/16* (2006.01)
*H04L 29/06* (2006.01)
*G06F 9/44* (2006.01)
*H04L 29/08* (2006.01)

(52) U.S. Cl.
CPC ............ *H04L 67/42* (2013.01); *G06F 9/4445* (2013.01); *H04L 67/06* (2013.01); *H04L 67/08* (2013.01)

(58) Field of Classification Search
CPC ......... H04L 67/42; H04L 67/08; H04L 67/06; G06F 9/4445
See application file for complete search history.

(56) References Cited

U.S. PATENT DOCUMENTS

| 6,081,833 A | 6/2000 | Okamoto et al. |
| 2003/0091963 A1 | 5/2003 | Fukushima |
| 2011/0185292 A1* | 7/2011 | Chawla ................. G06F 9/5077 715/760 |
| 2011/0231840 A1* | 9/2011 | Burch ................. G06F 9/45533 718/1 |

(Continued)

FOREIGN PATENT DOCUMENTS

| JP | 9-22398 | 1/1997 |
| JP | 2001-312422 | 11/2001 |

(Continued)

OTHER PUBLICATIONS

Japanese Office Action dated Feb. 10, 2015 in corresponding Japanese Patent Application No. 2013-539440.

(Continued)

*Primary Examiner* — Cheikh Ndiaye
(74) *Attorney, Agent, or Firm* — Staas & Halsey LLP (57) ABSTRACT

Upon reception of a connection request from a client terminal, a control device couples a providing server that provides a virtual desktop environment to the client terminal. The control device then causes the client terminal to transfer a file maintained in the client terminal to the providing server to which the client terminal is coupled, according to correspondence information in which path information in the client terminal is associated with path information in the virtual desktop environment for each file used by the client terminal for executing an application in the virtual desktop environment. This facilitates file transfer on the client terminal side for transferring the file to a server in the virtual desktop environment.

7 Claims, 8 Drawing Sheets

(56) References Cited

U.S. PATENT DOCUMENTS

2012/0304168 A1* 11/2012 Raj Seeniraj ......... G06F 9/4445
718/1
2013/0013865 A1* 1/2013 Venkatesh ......... G06F 17/30132
711/133

FOREIGN PATENT DOCUMENTS

| JP | 2003-44333 | 2/2003 |
| JP | 2011-76251 | 4/2011 |

OTHER PUBLICATIONS

Yokoyama, "Make full use of new functions like Hyper-V and VDI!", Windows Server 2008 R2 Operation Techniques, Japan, Ascii Media Works, Co., Ltd., May 24, 2010, pp. 1-23 (English), pp. 1-9.

"Have your important files left on desktop!? Best cloud service for lazy person," *ASCII PC*, Sep. 2011, pp. 57-61 and two translation pages.

International Search Report mailed Feb. 28, 2012 in corresponding International Patent Application No. PCT/JP2011/073960.

* cited by examiner

| PATH OF FILE TRANSFER SOURCE (211a) | FILE NAME (211b) | PATH OF FILE TRANSFER DESTINATION (211c) |
|---|---|---|
| c:¥aa¥bb¥ | x1.dat | c:¥pp¥qq¥ |
| c:¥aa¥bb¥ | x2.dat | c:¥pp¥qq¥ |
| c:¥cc¥dd¥ | x3.dat | c:¥rr¥ss¥ |

| USER ID (212a) | PASSWORD (212b) | IP ADDRESS ON CLIENT TERMINAL SIDE (212c) | IP ADDRESS ON PROVIDING SERVER SIDE (212d) | USED OS (212e) | AVAILABLE APPLICATION (212f) |
|---|---|---|---|---|---|
| user001 | xxx | c_adrs001 | vd_adrs001 | Windows | Word, Excel··· |
| ⋮ | ⋮ | ⋮ | ⋮ | ⋮ | ⋮ |
| | | | | | |

CONTROL DEVICE, AND METHOD FOR TRANSFER CONTROL

CROSS-REFERENCE TO RELATED APPLICATION

This application is a continuation of International Application No. PCT/JP2011/073960, filed on Oct. 18, 2011, the entire contents of which are incorporated herein by reference.

FIELD

The embodiments discussed herein are related to a transfer control program, for example.

BACKGROUND

In recent years, a service provision model called Desktop-as-a-Service (DaaS) has been known, which provides a virtual desktop environment to a client from a server through a network. In DaaS, a file that has been used by a client is usually transferred to a server so as to be used by the server. Conventional technologies are described in Japanese Laid-open Patent Publication No. 09-22398 and Japanese Laid-open Patent Publication No. 2001-312422, for example.

In a conventional form of DaaS, however, there is a problem in that the file transfer takes effort for a client to transfer a file used by the client to the server. For example, every time when the server uses the file used by the client, the client needs to specify the transfer source of the file to be transferred and the server as a transfer destination and then transfer the file to the transfer destination, thereby making the file transfer time-consuming for the client. In addition, the server provided to the client as a virtual desktop environment is usually changed every time when the server is provided. The client accordingly needs to specify the provided server as the transfer destination and then transfer the file to the transfer destination, whereby the file transfer is even more time-consuming for the client.

The remote desktop connection for Windows (registered trademark) has a function in which the file the client has used is not transferred to the server so that the server can directly access the file of the client. However, if a server directly accesses and updates a file of the client, a security problem is likely to occur. In addition, such an access to and/or update of the file of the client by the server may be prohibited due to settings of a firewall on the server side.

SUMMARY

According to an aspect of an embodiment, a non-transitory computer-readable recording medium stores a program. The program causes a computer to execute a transfer control process. The transfer control process includes coupling a virtual machine that provides a virtual desktop environment to a client upon reception of a connection request from the client. The transfer control process includes transferring data maintained in the client from the client to the virtual machine to which the client is coupled, according to correspondence information in which path information in the client is associated with path information in the virtual desktop environment for each piece of data used by the client to execute an application in the virtual desktop environment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The present invention, however, is not limited to this. In the embodiments below, various files used in an application are regarded as an example of data.

[a] First Embodiment

Configuration of Transfer Control System According to a First Embodiment

Figure 1:
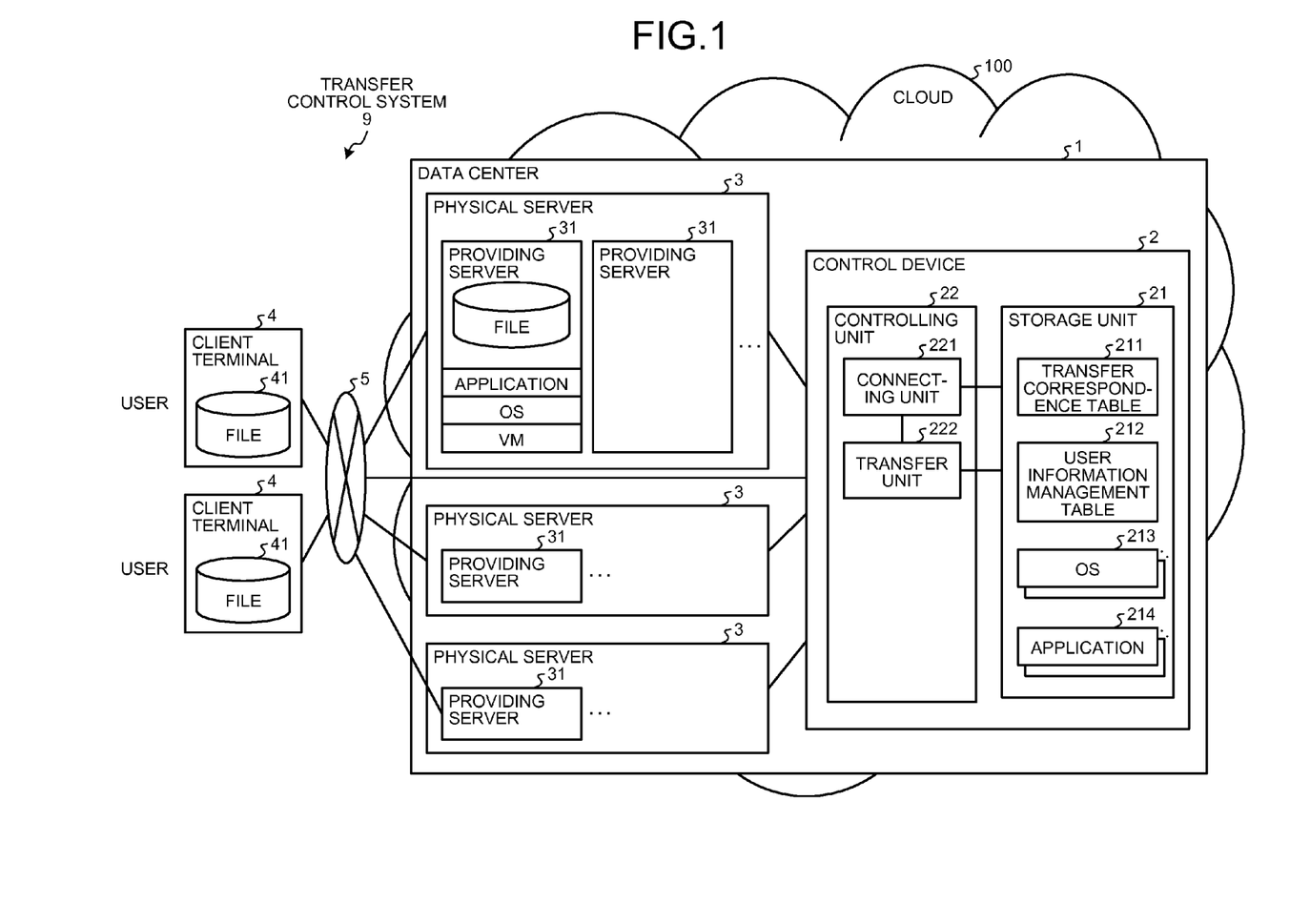
FIG. 1 is a functional block diagram illustrating a configuration of a transfer control system according to a first embodiment.

FIG. 1 is a functional block diagram illustrating a configuration of a transfer control system according to the first embodiment. As illustrated in FIG. 1, a transfer control system 9 includes a data center 1 on cloud 100 and a plurality of client terminals 4. The data center 1 represents a data center of the Internet, that is, an Internet data center (IDC), and includes a control device 2 and a plurality of physical servers 3. The control device 2 and the physical servers 3 are coupled to one or more units of the client terminals 4 through a network 5. A representative example of the network 5 is the Internet; however, the network 5 may be an intranet or an extranet using the Internet, a carrier network, or a cellular network. In the embodiment, the network 5 is described as the Internet.

A plurality of providing servers 31 each serving as a virtual desktop environment (VD) are allocated to each of the physical servers 3. The substance of the providing server 31 is an operating system (OS) of Windows (registered trademark), an application for accomplishing works, and a virtual machine (VM) including an OS and/or applications. An OS and an application out of the substances are loaded on the providing server 31 by the control device 2 that has received a connection request from a user.

The cloud 100 provides to a user who uses the client terminal 4 with a service provided by the providing server 31 without user's recognition of any physical substance. The service provided by the providing server 31 refers to a service called DaaS providing a virtual desktop environment to the client terminal 4.

The control device 2 includes a storage unit 21 and a controlling unit 22. The storage unit 21 includes a transfer correspondence table 211, a user information management table 212, an OS 213, and an application 214. The storage unit 21 corresponds to a semiconductor memory device such as a random access memory (RAM), a read only memory (ROM), and a flash memory, or a storage device such as a hard disk and an optical disc.

Figure 2:
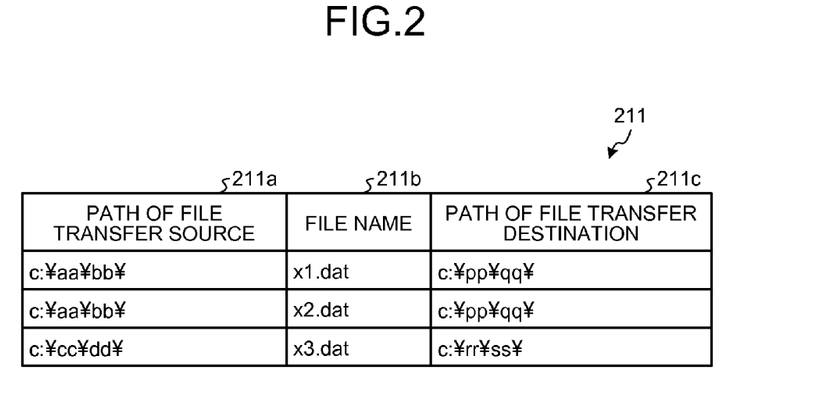
FIG. 2 is a diagram illustrating an example of a data structure of a transfer correspondence table.

The transfer correspondence table 211 associates path information in the client terminal 4 used by the user with path information in the virtual desktop environment for each file 41 used by the user for executing an application in the virtual desktop environment. The transfer correspondence table 211 stores therein the associated information. The transfer correspondence table 211 is stored for each user. The following describes a data structure of the transfer correspondence table 211 with reference to FIG. 2. FIG. 2 is a diagram illustrating an example of a data structure of the transfer correspondence table. As illustrated in FIG. 2, the transfer correspondence table 211 associates a path of file transfer source 211a, a file name 211b, and a path of file transfer destination 211c with each other and stores therein the associated information.

The path of file transfer source 211a indicates a directory where the file of the client terminal 4, which is the file transfer source, is maintained. The file name 211b indicates a name of the file maintained in the client terminal 4. The path of file transfer destination 211c indicates a directory of the transfer destination for transferring the file to the providing server 31, which is the destination.

For example, if the file name 211b is "x1.dat", the transfer correspondence table 211 stores therein the path of file transfer source 211a as "c:\aa\bb\" and the path of file transfer destination 211c as "c:\pp\qq\". If the file name 211b is "x2.dat", the transfer correspondence table 211 stores therein the path of file transfer source 211a as "c:\aa\bb\" and the path of file transfer destination 211c as "c:\pp\qq\". If the file name 211b is "x3.dat", the transfer correspondence table 211 stores therein the path of file transfer source 211a as "c:\cc\dd\" and the path of file transfer destination 211c as "c:\rr\ss\".

Figure 3:
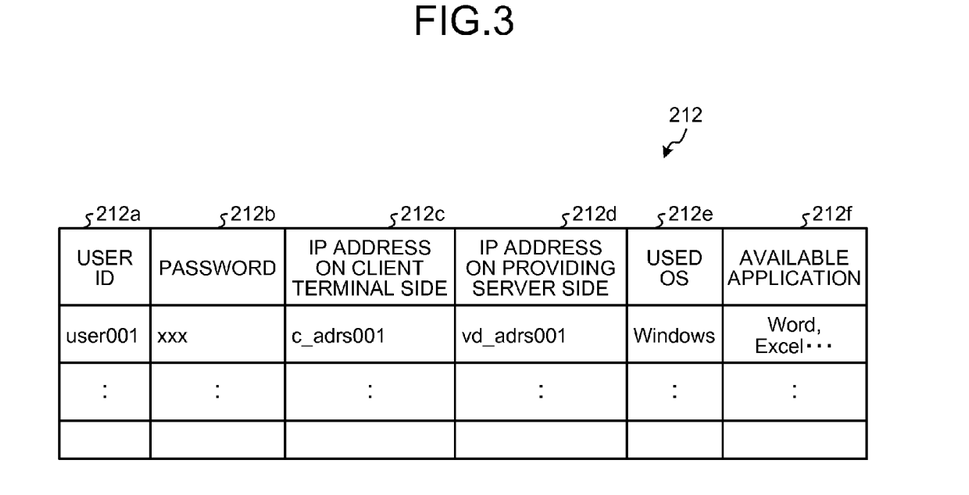
FIG. 3 is a diagram illustrating an example of a data structure of a user information management table.

The user information management table 212 manages user information for each user. The following describes a data structure of the user information management table 212 with reference to FIG. 3. FIG. 3 is a diagram illustrating an example of a data structure of a user information management table. As illustrated in FIG. 3, the user information management table 212 stores therein a user identification (ID) 212a, a password 212b, an Internet protocol (IP) address on the client terminal side 212c and an IP address on the providing server side 212d, for each user ID. The user information management table 212 also stores therein a used OS 212e and an available application 212f for each user ID.

The user ID 212a represents an ID of a user who uses DaaS. The password 212b represents a password corresponding to a user ID written in the user ID 212a. The password 212b is used for user authentication. The IP address on the client terminal side 212c represents an IP address of the client terminal 4. The IP address on the providing server side 212d represents an IP address of the providing server 31. The IP address on the client terminal side 212c and the IP address on the providing server side 212d are used for transferring a file to the providing server 31. The used OS 212e represents a name of an OS used by a user, such as Windows (registered trademark) and Unix (registered trademark). The available application 212f represents a name of an application available for a user, such as software related to Word, Excel, or computer-aided design (CAD).

For example, if the user ID 212a is "User001", the user information management table 212 stores therein the password 212b as "xxx" and the IP address on the client terminal side 212c as "c_adrs001". The user information management table 212 also stores therein the IP address on the providing server side 212d as "vd_adrs001". In addition, the user information management table 212 stores therein the used OS 212e as "Windows" and the available application 212f as "Word, Excel, . . . ".

The OS 213 stores therein an executable file of an OS. The stored OS includes an OS that can be used by a user. The application 214 stores therein an executable file of an application. The stored application includes an application that can be used by a user.

The controlling unit 22 includes a connecting unit 221 and a transfer unit 222. The controlling unit 22 corresponds to an integrated device such as an application specific integrated circuit (ASIC) and a field programmable gate array (FPGA). The controlling unit 22 corresponds to an electronic circuit such as a central processing unit (CPU) and a micro processing unit (MPU).

If the connecting unit 221 receives a connection request from the client terminal 4, the connecting unit 221 couples a virtual machine that provides a virtual desktop environment to the client terminal 4. For example, if the connecting unit 221 receives a connection request from a client terminal 4, the connecting unit 221 collates a user ID and a password included in the connection request with the user ID 212a and the password 212b stored in the user information management table 212 to perform user authentication. If the user authentication succeeds, the connecting unit 221 then selects a providing server 31 not in use out of the providing servers 31 allocated to the physical servers 3. Subsequently, the connecting unit 221 notifies the client terminal 4 of the IP address of the selected providing server 31. The connecting unit 221 then causes the client terminal 4 to couple to the providing server 31 having the IP address that has been notified, by using a remote desktop protocol (RDP), for example. Subsequently, the connecting unit 221 stores the IP address on the client terminal side and the IP address on the providing server side, in the area each corresponding to the user ID in the user information management table 212.

The connecting unit 221 retrieves the used OS 212e corresponding to the user ID from information stored in the user information management table 212, and loads to the providing server 31 the OS 213 that is an executable file of the retrieved used OS 212e. The connecting unit 221 retrieves the available application 212f corresponding to the user ID from information stored in the user information management table 212. Subsequently, the connecting unit 221 loads to the providing server 31 the application 214 that is an executable file of the retrieved available application 212f. This enables the connecting unit 221 to provide a virtual desktop from the providing server 31 to the client terminal 4.

The transfer unit 222 causes the client terminal 4 to transfer a file maintained in the client terminal 4 to a virtual machine to which the client terminal 4 is coupled according to the transfer correspondence table 211. For example, if the transfer unit 222 receives a transfer request for a file from the client terminal 4, the transfer unit 222 retrieves the path of file transfer source 211a and the path of file transfer destination 211c for the file from the transfer correspondence table 211. Subsequently, the transfer unit 222 transmits the retrieved path information to the client terminal 4. The transfer unit 222 then causes the client terminal 4 to transfer the file to the providing server 31 to which the client terminal 4 is coupled according to a command generated from the transmitted path information and the IP address of the providing server 31 to which the client terminal 4 is coupled. For example, the client terminal 4 generates a file transfer command that specifies the path of transfer source and the path of transfer destination of the file for which the transfer request is issued, which has been transmitted from the transfer unit 222, and the IP address of the providing server 31. Subsequently, the client terminal 4 executes the generated file transfer command. This enables the client terminal 4 to transfer (upload) the file maintained on the path of file transfer source in the client terminal 4 to the path of file transfer destination in the providing server 31 that is being coupled to the client terminal 4.

As described above, the control device 2 automatically transmits the file in the area indicated by the path in the client terminal 4 to the path in the virtual desktop environment according to the transfer correspondence table 211 in which the path in the client terminal 4 is associated with the path in the virtual desktop environment. This facilitates the file transfer on the client terminal 4 side compared with the file transfer in which a user specifies the path in the virtual desktop environment that is a destination of the file to be transferred, every time when the user uses the virtual desktop environment.

[b] Second Embodiment

In the first embodiment, the transfer correspondence table 211 that stores therein the associated information already exists, in which the path in the client terminal 4 is associated with the path in the virtual desktop environment. This means that the control device 2 controls the client terminal 4 to transfer the file maintained in the client terminal 4 to the virtual desktop environment according to the already existing transfer correspondence table 211. However, the control device 2 here is provided merely for exemplary purpose and is not limited to this example. If the transfer correspondence table 211 including the associated information does not exist, the control device 2 may control the client terminal 4 to select the file to be transferred and to add the associated information of the selected file to the transfer correspondence table 211. Subsequently, the control device 2 controls the client terminal 4 to transfer the file maintained in the client terminal 4 to the virtual desktop environment according to the transfer correspondence table 211 to which the associated information has been added.

In a second embodiment, therefore, a control device 2A is described, which controls the client terminal 4 to select the file to be transferred and to add the associated information of the selected file to the transfer correspondence table 211, if the corresponding data of the transfer correspondence table 211 does not exist.

Configuration of Control Device According to the Second Embodiment

Figure 4:
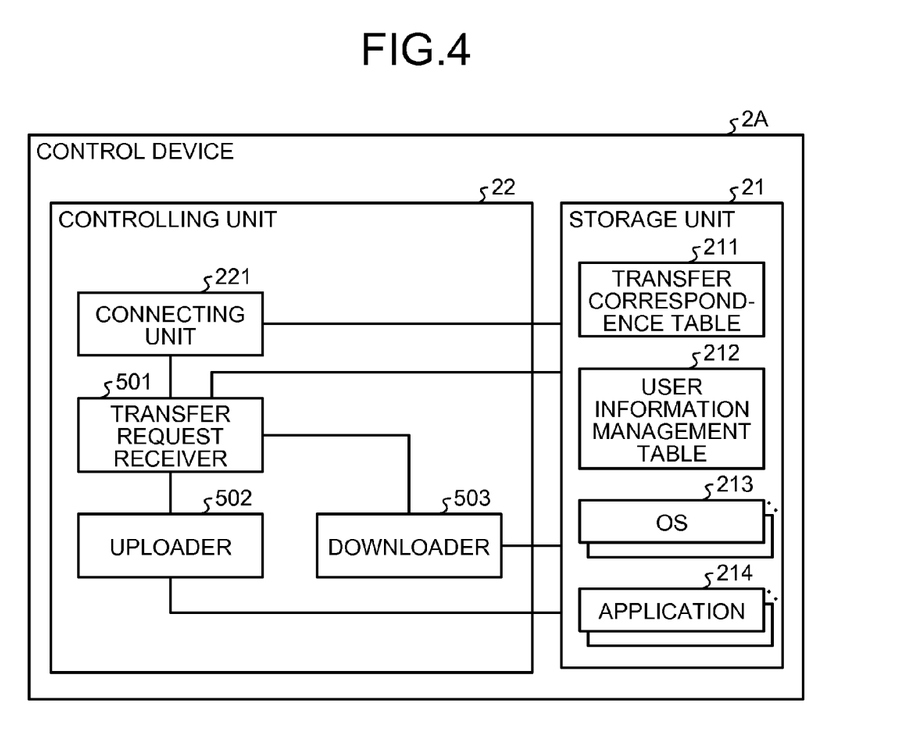
FIG. 4 is a functional block diagram illustrating a configuration of a control device according to a second embodiment.

FIG. 4 is a functional block diagram illustrating a configuration of a control device according to the second embodiment. In the description below, common numerals are assigned to the same components as those in the control device 2 illustrated in FIG. 1 described above, and overlapping explanation on the configuration and operations thereof will be omitted. The difference between the first embodiment and the second embodiment is that the transfer unit 222 is removed, and a transfer request receiver 501, an uploader 502, and a downloader 503 are added.

The transfer request receiver 501 causes the client terminal 4 to select the file to be transferred to the virtual machine coupled to the client terminal 4 out of the files indicated by the associated information stored in the transfer correspondence table 211, and receives a file transfer (upload) request for the selected file. For example, the transfer request receiver 501 displays on a monitor of the client terminal 4 a transfer files list screen on the virtual desktop environment. The transfer files list screen refers to a screen of a list of files to be transferred in the virtual desktop environment. For example, if data of the transfer correspondence table 211 corresponding to the user ID already exists, the transfer request receiver 501 displays information of a file in the transfer source in which the path of file transfer source 211a is combined with the file name 211b, and information of the path of file transfer destination 211c on the screen. This enables the user to select the file to be uploaded from the client terminal 4 to the providing server 31 by using the transfer files list screen. Subsequently, the transfer request receiver 501 stands by for the upload request from the client terminal 4 through the transfer files list screen and receives the upload request for the file to be uploaded.

If data of the transfer correspondence table 211 corresponding to the user ID does not exist, the transfer request receiver 501 displays an adding transfer file screen that is a sub-screen of the transfer files list screen on the monitor of the client terminal 4. The adding transfer file screen refers to a screen for adding a file to be transferred in the virtual desktop environment. For example, the transfer request receiver 501 displays the transfer source file on the client terminal 4 side and the path of file transfer destination on the providing server 31 side in the adding transfer file screen for selecting the transfer source file on the client terminal 4 side and the path of file transfer destination on the providing server 31 side. This enables the user to add a file to be uploaded from the client terminal 4 to the providing server 31 by using the adding transfer file screen. Subsequently, the transfer request receiver 501 stands by for an upload request from the client terminal 4 through the transfer files list screen and receives the upload request for the file to be uploaded.

The transfer request receiver 501 causes the client terminal 4 to select the file to be transferred to the client terminal 4 from the virtual machine (VM) coupled to the client terminal 4 by using the transfer files list screen if an application in the virtual desktop is ended. Subsequently, the transfer request receiver 501 receives a transfer (download) request for the selected file.

Figure 5:
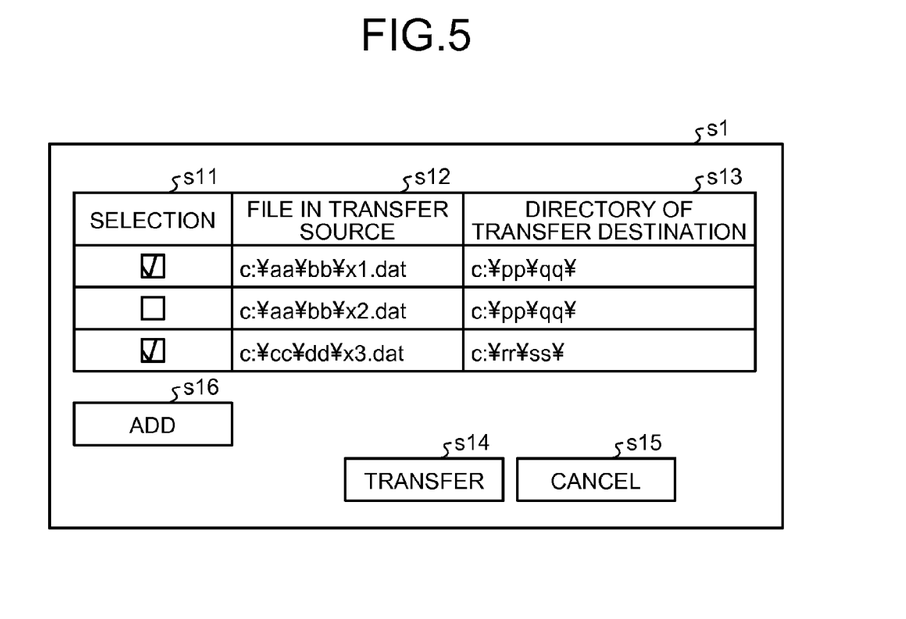
FIG. 5 is a diagram illustrating an example of a screen layout of a transfer files list screen.

The following describes an example of a screen layout of a transfer files list screen s1 for uploading a file with reference to FIG. 5. FIG. 5 is a diagram illustrating an example of a screen layout of the transfer files list screen. As illustrated in FIG. 5, the transfer files list screen s1 displays a selection s11, a file in the transfer source s12, and a directory of transfer destination s13 associated with each other. The transfer files list screen s1 also displays a transfer button s14, a cancel button s15, and an add button s16.

The file in the transfer source s12 represents a file in the transfer source. For example, if transfer information is present in the transfer correspondence table 211, the transfer request receiver 501 displays in the file in the transfer source s12 a name of the file in the transfer source in which the path of file transfer source 211a is associated with the file name 211b stored in the transfer correspondence table 211. The directory of transfer destination s13 represents the path of transfer destination of the file. For example, if the transfer information is present in the transfer correspondence table 211, the transfer request receiver 501 displays in the directory of transfer destination s13 the path of file transfer destination 211c stored in the transfer correspondence table 211. The selection s11 is a column for checking whether to select the file in the transfer source s12 and the directory of transfer destination s13 associated with each other as a subject for transfer. For example, the transfer request receiver 501 displays a checkbox in the selection s11.

The transfer button s14 is a button used for transferring a subject for transfer selected in the selection s11. The cancel button s15 is a button used for cancelling operations on the transfer files list screen s1. The add button s16 is a button used for adding transfer information to the transfer correspondence table 211. The add button s16 is pressed if data of the transfer correspondence table 211 corresponding to the user ID does not exist, or additional transfer information is added to the transfer correspondence table 211. If the add button s16 is pressed, the transfer request receiver 501 displays the adding transfer file screen.

The screen layout of the transfer files list screen for downloading files is the same as that of the transfer files list screen s1 for uploading files, therefore, overlapping description will be omitted. The file in the transfer source s12 here; however, refers to a name of a file in the download destination, in which the path of the download destination that is the path on the client terminal 4 side is combined with the file name. In addition, the directory of transfer destination s13 refers to the path of the download source that is the path on the providing server 31 side. The add button s16 may not be displayed in the transfer files list screen for downloading files because it is not used for downloading.

Figure 6:
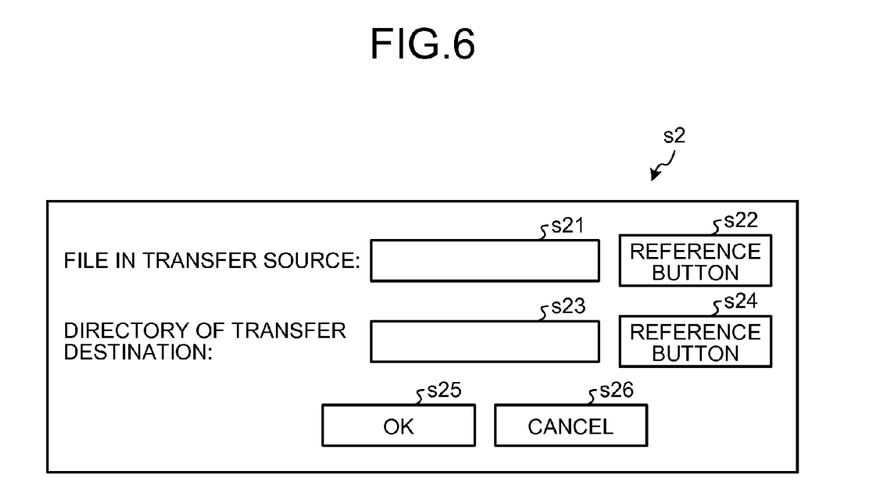
FIG. 6 is a diagram illustrating an example of a screen layout of an adding transfer file screen.

The following describes an example of a screen layout of an adding transfer file screen s2 with reference to FIG. 6. FIG. 6 is a diagram illustrating an example of a screen layout of an adding transfer file screen. As illustrated in FIG. 6, the adding transfer file screen s2 displays thereon a text box s21 and a reference button s22 for the file in the transfer source, and a text box s23 and a reference button s24 for the directory of transfer destination. The adding transfer file screen s2 also displays thereon an OK button s25 and a cancel button s26.

The text box s21 is a display area for displaying a file in the transfer source. In the text box s21, information of a file in the transfer source may be directly input or indirectly input through the reference button s22. The reference button s22 is a button used for referring to a file stored in the client terminal 4. For example, if the reference button s22 is pressed, the transfer request receiver 501 displays a list box that displays therein file information in which a drive name, a directory, and a file name are combined with each other, for each file stored in the client terminal 4. If the file information is selected from the list box, the transfer request receiver 501 displays the selected file information in the text box s21.

The text box s23 is a display area for displaying a directory of transfer destination. In the text box s23, a directory of transfer destination may be directly input or indirectly input through the reference button s24. The reference button s24 is a button used for referring to a directory of a file transfer destination in the providing server 31 serving as a virtual desktop environment. For example, if the reference button s24 is pressed, the transfer request receiver 501 displays a list box that displays file information in which a drive name and a directory are combined with each other. If the directory of file transfer destination is selected from the list box, the transfer request receiver 501 displays the information in the text box s23.

The OK button s25 is a button used for adding the file in the transfer source that has been input in the text box s21 and the directory of transfer destination that has been input in the text box s23 as transfer information to the transfer correspondence table 211. The cancel button s26 is a button used for cancelling operations on the adding transfer file screen s2.

With reference to FIG. 4 again, the uploader 502 causes the client terminal 4 to transfer the file for which the transfer request receiver 501 receives the upload request to the transfer destination that is the virtual machine according to the transfer correspondence table 211.

For example, the uploader 502 acquires from the transfer request receiver 501 information including a path of the file in the transfer source and a file name, and information of a directory of transfer destination. The uploader 502 then determines whether the acquired information is present in the transfer correspondence table 211. If the uploader 502 determines that the acquired information is present in the transfer correspondence table 211, the uploader 502 retrieves the path of file transfer source 211a of the file in the transfer source and the path of file transfer destination 211c in the information from the transfer correspondence table 211. Subsequently, the uploader 502 transmits the retrieved path information to the client terminal 4 that has issued the transfer request.

If the uploader 502 determines that the acquired information is not present in the transfer correspondence table 211, the uploader 502 stores the acquired information in the transfer correspondence table 211. That is, the uploader 502 stores information including the path of the file in the transfer source in the path of file transfer source 211a and information including the file name in the file name 211b, out of the acquired information. In addition, the uploader 502 stores information on a directory of transfer destination out of the acquired information in the path of file transfer destination 211c. Subsequently, the uploader 502 transmits the path information including the path of file transfer source 211a relating to the file in the transfer source and the path of file transfer destination 211c that has been stored in the transfer correspondence table 211 to the client terminal 4 that has issued the transfer request.

The uploader 502 causes the client terminal 4 to transfer the file in the transfer source to the providing server 31 to which the client terminal 4 is coupled according to a command generated from the path information transmitted to the client terminal 4 and the IP address of the transfer destination to which the client terminal 4 is coupled. For example, the client terminal 4 generates a file transfer command that specifies the path of file transfer source and the path of file transfer destination, which has been transmitted from the uploader 502, and the IP address of the providing server 31. Subsequently, the client terminal 4 executes the generated file transfer command. This enables the client terminal 4 to transfer (upload) the file maintained on the path of file transfer source in the client terminal 4 to the path of file transfer destination in the providing server 31 being coupled to the client terminal 4.

The downloader 503 causes the virtual machine to transfer the file for which the transfer request receiver 501 receives the download request to the client terminal 4 according to the transfer correspondence table 211.

For example, the downloader 503 acquires from the transfer request receiver 501 information including a path of the file in the transfer source and a file name, and information of a directory of transfer destination. That is, the downloader 503 acquires information including the path of the download destination (the client terminal 4) and the file name, and information of the directory of download source (the providing server 31). The downloader 503 then determines whether the acquired information is present in the transfer correspondence table 211. If the downloader 503 determines that the acquired information is present in the transfer correspondence table 211, the downloader 503 retrieves the path of file transfer source 211a of the file in the download source and the path of file transfer destination 211c in the acquired information. Subsequently, the downloader 503 transmits the retrieved path of file transfer source 211a as the path of the download destination to the providing server 31 serving as a virtual desktop environment. The downloader 503 also transmits the retrieved path of file transfer destination 211c as the path of the download source. Specifically, the downloader 503 transmits the path of download source of the file in the download source in the providing server 31, and the path of download destination in the client terminal 4 to the providing server 31. If the downloader 503 determines that the acquired information is not present in the transfer correspondence table 211, the downloader 503 determines that the acquired information has an error, and thus does not transmit the information to the providing server 31 and cancels the download of the file specified by the information.

The downloader 503 causes the providing server 31 to transfer the file in the download source to the client terminal 4 coupled to the providing server 31 according to a command generated from the transmitted information and the IP address of the client terminal 4. For example, the providing server 31 generates a file transfer command that specifies the path of download source in the providing server 31 and the path of download destination in the client terminal 4, which has been transmitted from the downloader 503, and the IP address of the client terminal 4. Subsequently, the providing server 31 executes the generated file transfer command. This enables the providing server 31 to transfer (download) the file in the download source maintained on the path of the file download source in the providing server 31 to the path of the download destination in the client terminal 4.

Figure 7:
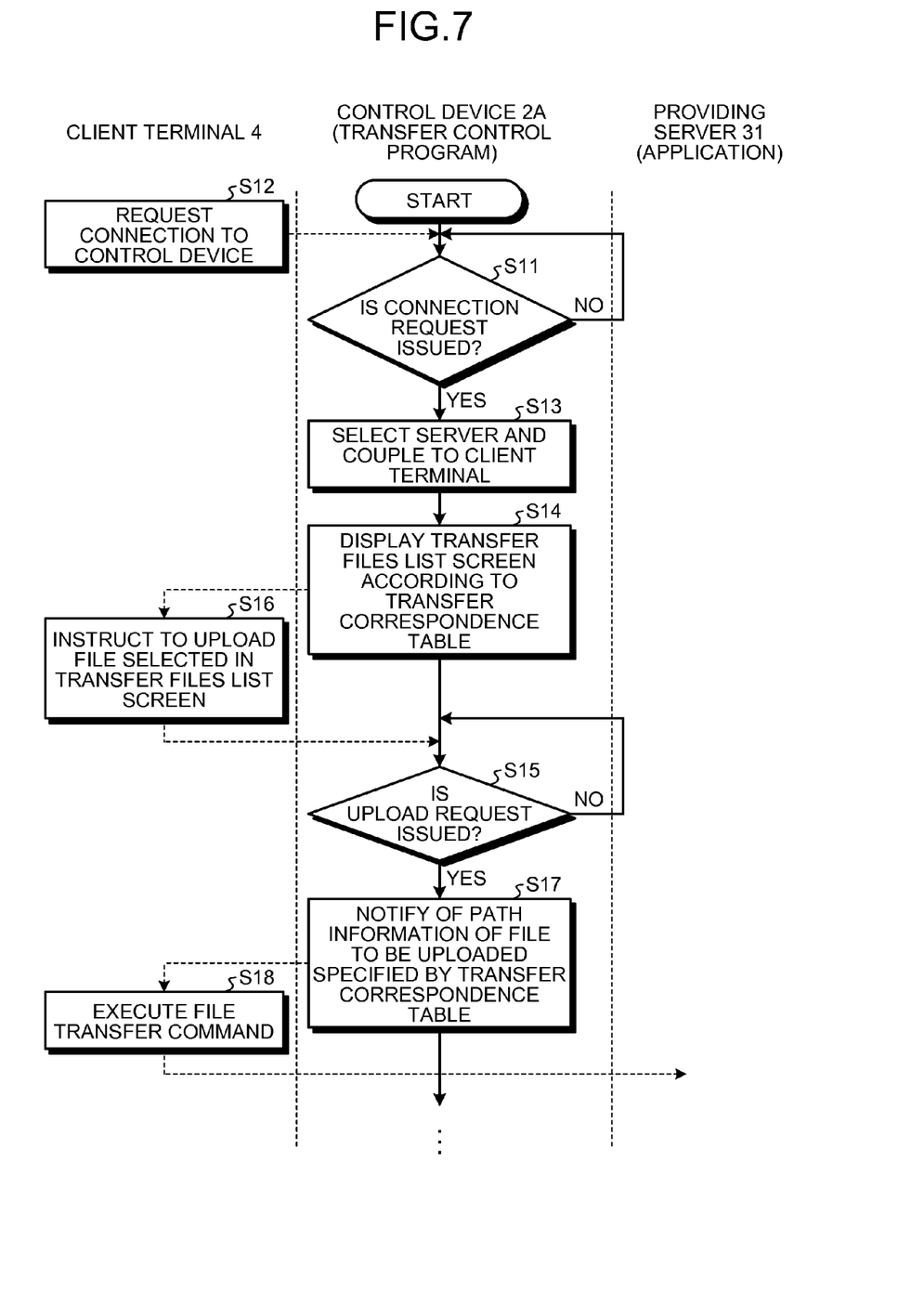
FIG. 7 is a diagram for explaining a sequence of a processing procedure of transfer control (when a transfer correspondence table exists)

Processing Procedure of Transfer Control when Transfer Correspondence Table Exists The following describes a processing procedure of transfer control when the transfer correspondence table exists that includes the user ID of the user who uses the virtual desktop environment, with reference to FIG. 7. FIG. 7 is a diagram for explaining a sequence of a processing procedure of transfer control (when the transfer correspondence table exists).

Firstly, the connecting unit 221 of the control device 2A determines whether the client terminal 4 has issued a connection request for standing by for the connection request from the client terminal 4 (Step S11). If the connecting unit 221 determines that the client terminal 4 does not issue any connection request (No at Step S11), the connecting unit 221 repeats the determining process until the client terminal 4 issues a connection request.

On this occasion, the client terminal 4 requests the control device 2A to couple the client terminal 4 to a virtual desktop environment (Step S12). The connecting unit 221 of the control device 2A then determines that the client terminal 4 has issued a connection request (Yes at Step S11), and selects a providing server 31 for coupling it to the client terminal 4 (Step S13). For example, the connecting unit 221 selects a providing server 31 not in use out of the providing servers 31 allocated to the physical servers 3 and notifies the client terminal 4 of the IP address of the selected providing server 31. The connecting unit 221 then causes the client terminal 4 to couple to the providing server 31 by using the IP address that has been notified, through an RDP, for example.

The transfer request receiver 501 of the control device 2A displays on the monitor of the client terminal 4 a transfer files list screen on the virtual desktop environment according to the transfer correspondence table 211 (Step S14). For example, the transfer request receiver 501 retrieves the path of file transfer source 211a, the file name 211b, and the path of file transfer destination 211c corresponding to the user ID from the correspondence information stored in the transfer correspondence table 211. Subsequently, the transfer request receiver 501 displays information of the file transfer source in which the path of file transfer source 211a is combined with the file name 211b, and information of the path of transfer destination representing the path of file transfer destination 211c on the transfer files list screen.

Subsequently, the transfer request receiver 501 determines whether the client terminal 4 had issued an upload request for standing by for the upload request from the client terminal 4 (Step S15). If the transfer request receiver 501 determines that the client terminal 4 has issued no upload request (No at Step S15), the transfer request receiver 501 repeats the determining process until the client terminal 4 issues an upload request.

On this occasion, the client terminal 4 instructs the control device 2A to upload the file selected in the transfer files list screen (Step S16). For example, the user who uses the client terminal 4 selects a file to be uploaded from the client terminal 4 to the providing server 31 by using the transfer files list screen, and requests the control device 2A to upload the selected file. The client terminal 4 transmits an upload request including information of the file in the transfer source and the path information of the transfer destination for the selected file to the control device 2A.

The transfer request receiver 501 of the control device 2A then determines that the client terminal 4 has issued an upload request (Yes at Step S15), and the process sequence proceeds to Step S17. Subsequently, the uploader 502 of the control device 2A notifies the client terminal 4 of the path information of the file to be uploaded specified by the client terminal 4 according to the transfer correspondence table 211 (Step S17). For example, the uploader 502 acquires the information of the file in the transfer source and the path information of the transfer destination related to the file to be uploaded from the transfer request receiver 501. Subsequently, the uploader 502 determines that the acquired information exists in the transfer correspondence table 211, and notifies the client terminal 4 of the path of file transfer source 211a and the path of file transfer destination 211c on the file to be uploaded in the information.

The client terminal 4 then executes the file transfer command by using the information notified by the control device 2A (Step S18). For example, the client terminal 4 acquires the path of file transfer source and the path of file transfer destination of the file to be uploaded, which have been notified by the control device 2A. Subsequently, the client terminal 4 generates a file transfer command specifying the acquired path of file transfer source and the acquired path of file transfer destination, and the IP address of the providing server 31. The client terminal 4 executes the generated file transfer command.

This enables the client terminal 4 to upload the file to be uploaded that is maintained on the path of file transfer source in the client terminal 4 to the path of file transfer destination in the providing server 31.

Figure 8:
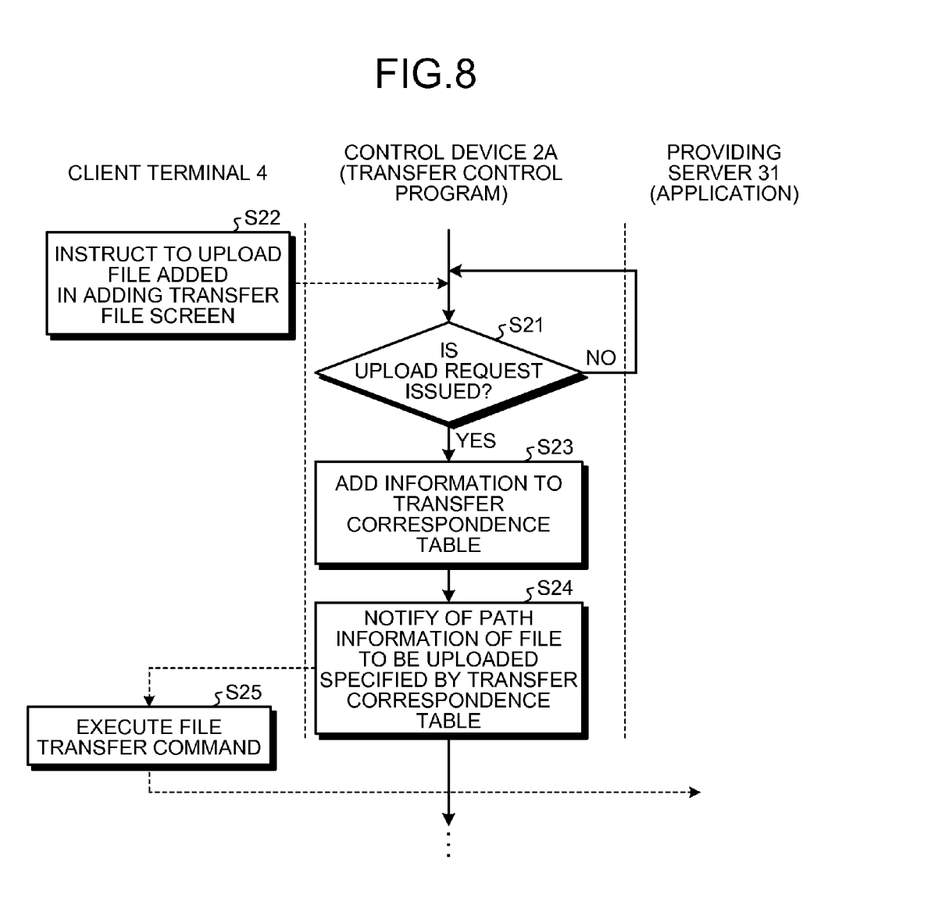
FIG. 8 is a diagram for explaining a sequence of a processing procedure of transfer control (when associated information is added to the transfer correspondence table)

Processing Procedure of Transfer Control when Associated Information is Added to Transfer Correspondence Table The following describes a processing procedure of transfer control when associated information is added to the transfer correspondence table that includes the user ID of the user who uses a virtual desktop environment, with reference to FIG. 8. FIG. 8 is a diagram for explaining a sequence of a processing procedure of transfer control (when associated information is added to the transfer correspondence table). A virtual desktop environment is provided to the client terminal 4 and the transfer files list screen on the virtual desktop environment is displayed on the monitor of the client terminal 4.

The transfer request receiver 501 determines whether the client terminal 4 has issued an upload request for standing by for the upload request from the client terminal 4 (Step S21). If the transfer request receiver 501 determines that the client terminal 4 has issued no upload request (No at Step S21), the transfer request receiver 501 repeats the determining process until the client terminal 4 issues an upload request.

On this occasion, the client terminal 4 instructs the control device 2A to upload the file added in the adding transfer file screen that is a sub-screen of the transfer files list screen (Step S22). For example, a user who uses the client terminal 4 adds a file to be uploaded from the client terminal 4 to the providing server 31 by using the adding transfer file screen, and requests the control device 2A to upload the added file. The client terminal 4 transmits an upload request including information of the file in the transfer source and the path information of the transfer destination for the added file to the control device 2A. The information of the file in the transfer source refers to information in which the path in the transfer source and the file name are combined with each other. The path information of the transfer destination refers to information on the path of the destination of the transfer.

The transfer request receiver 501 of the control device 2A then determines that the client terminal 4 has issued an upload request (Yes at Step S21), and the process sequence proceeds to Step S23. Subsequently, the uploader 502 of the control device 2A adds information on the added file to the transfer correspondence table 211 (Step S23). For example, the uploader 502 acquires the information of the file in the transfer source and the path information of the transfer destination on the file to be uploaded from the transfer request receiver 501. Because the acquired information is not present in the transfer correspondence table 211, the uploader 502 stores the information of the file in the transfer source out of the acquired information in the path of file transfer source 211*a* and the file name 211*b*. In addition, the uploader 502 stores the path information of the transfer destination out of the acquired information in the path of file transfer destination 211*c*.

The uploader 502 notifies the client terminal 4 of the path information of the file to be uploaded specified by the client terminal 4 according to the transfer correspondence table 211 (Step S24). For example, the uploader 502 notifies the client terminal 4 of the path of file transfer source 211*a* and the path of file transfer destination 211*c* on the file to be uploaded in the information stored in the transfer correspondence table 211.

The client terminal 4 then executes the file transfer command by using the information notified by the control device 2A (Step S25). For example, the client terminal 4 acquires the path of file transfer source and the path of file transfer destination of the file to be uploaded, which have been notified by the control device 2A. Subsequently, the client terminal 4 generates a file transfer command specifying the acquired path of file transfer source and the acquired path of file transfer destination, and the IP address of the providing server 31. The client terminal 4 executes the generated file transfer command.

This enables the client terminal 4 to upload the file to be uploaded that is maintained on the path of file transfer source in the client terminal 4 to the path of file transfer destination in the providing server 31.

Startup Procedure of Application

Figure 9:
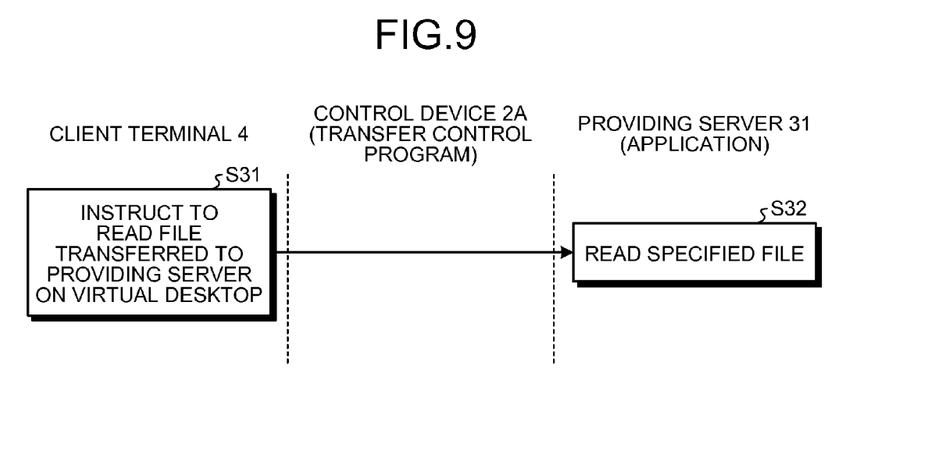
FIG. 9 is a diagram for explaining a sequence of a startup procedure of an application.

The following describes a startup procedure of an application using a virtual desktop environment, with reference to FIG. 9. FIG. 9 is a diagram for explaining a sequence of a startup procedure of an application. A virtual desktop environment is provided to the client terminal 4 and a file used for the application is uploaded on the virtual desktop environment. A user executes the application in the virtual desktop environment.

The client terminal 4 instructs the application to read the file transferred to the providing server 31 on the virtual desktop (Step S31). The specified file is the file used in the application loaded on the virtual desktop environment. The application on the providing server 31 then reads the specified file (Step S32). This enables the user who uses the virtual desktop environment to execute the application on the providing server 31 through the client terminal 4.

Processing Procedure of Transfer Control when Application is Ended

Figure 10:
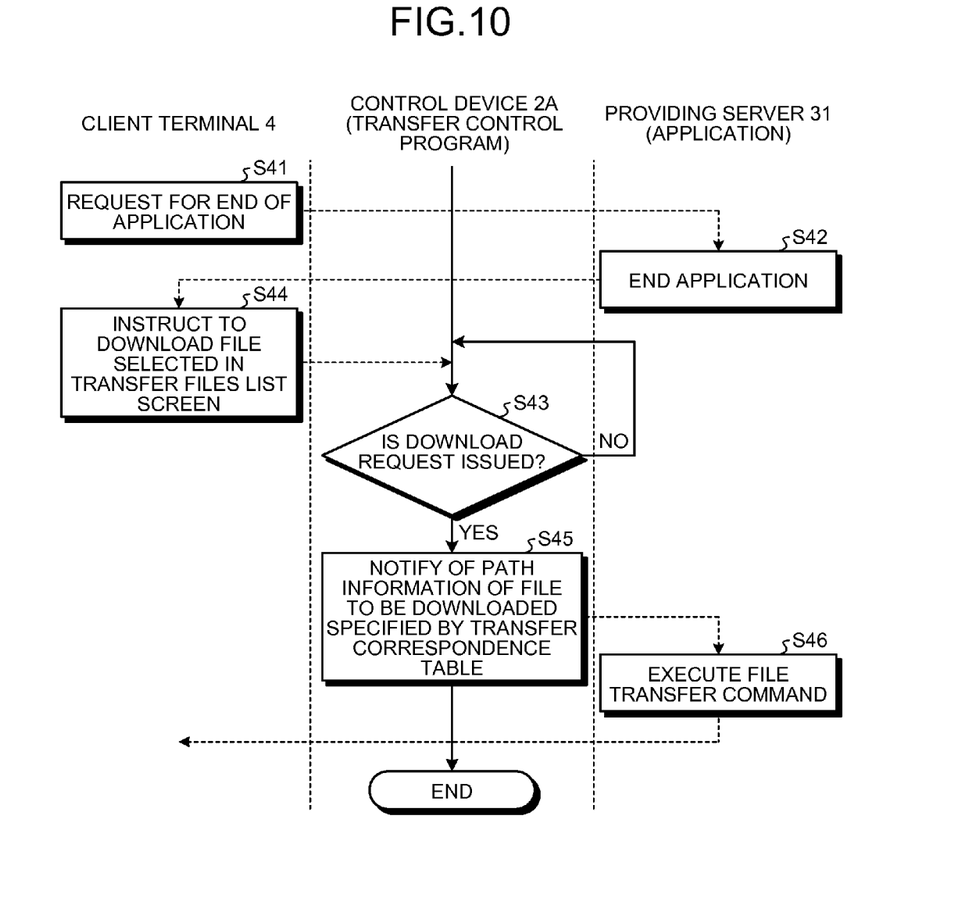
FIG. 10 is a diagram for explaining a sequence of a processing procedure of transfer control (when an application is ended)

The following describes a processing procedure of transfer control when an application using a virtual desktop environment is ended, with reference to FIG. 10. FIG. 10 is a diagram for explaining a sequence of a processing procedure of transfer control (when an application is ended). A virtual desktop environment is provided to the client terminal 4. A user executes the application in the virtual desktop environment.

Firstly, the client terminal 4 requests the end of the application (Step S41) executed in the providing server 31. The providing server 31 then ends the application that is being executed (Step S42).

Subsequently, the transfer request receiver 501 determines whether the client terminal 4 has issued a download request for standing by for the download request from the client terminal 4 (Step S43). If the transfer request receiver 501 determines that the client terminal 4 has issued no download request (No at Step S43), the transfer request receiver 501 repeats the determining process until the client terminal 4 issues a download request.

On this occasion, the client terminal 4 instructs the control device 2A to download the file selected in the transfer files list screen (Step S44). For example, a user who uses the client terminal 4 selects a file to be downloaded from the client terminal 4 to the providing server 31 by using the transfer files list screen, and requests the control device 2A to download the selected file. The client terminal 4 notifies the control device 2A of a download request including information of the file in the transfer source and the path information of the transfer destination for the selected file.

The transfer request receiver 501 of the control device 2A then determines that the client terminal 4 has issued a download request (Yes at Step S43), and the process sequence proceeds to Step S45. Subsequently, the downloader 503 of the control device 2A notifies the providing server 31 of the information of the file to be downloaded specified by the client terminal 4 according to the transfer correspondence table 211 (Step S45). For example, the downloader 503 acquires the information of the file in the transfer source and the path information of the transfer destination on the file to be downloaded from the transfer request receiver 501. If the acquired information exists in the transfer correspondence table 211, the downloader 503 retrieves the path of file transfer source 211a and the path of file transfer destination 211c on the file to be downloaded in the information. The downloader 503 then notifies the providing server 31 of the retrieved path of file transfer source 211a as the path of the download destination (the client terminal 4) and the retrieved path of file transfer destination 211c as the path of the download source (the providing server 31).

The providing server 31 then executes the file transfer command by using the information notified by the control device 2A (Step S46). For example, the providing server 31 acquires the path of the download destination and the path of the download source of the file to be downloaded, which have been notified by the control device 2A. Subsequently, the providing server 31 generates a file transfer command specifying the acquired path of the download destination and the acquired path of the download source, and the IP address of the client terminal 4. The providing server 31 executes the generated file transfer command.

This enables the providing server 31 to download the file in the download source maintained on the path of the file download source in the providing server 31 to the path of the file download destination in the client terminal 4.

Effects of Second Embodiment

According to the second embodiment described above, the control device 2A receives an upload request for a file from the client terminal 4 to which a virtual desktop is provided. Subsequently, the control device 2A transmits the path information in the client terminal 4 and the path information in the virtual desktop environment (the providing server 31) in the associated information of the file that has been stored in the transfer correspondence table 211 to the client terminal 4. The control device 2A then causes the client terminal 4 to transfer the file to the providing server 31 according to a command generated from the transmitted path information and the IP address of the providing server 31. For this reason, the control device 2A automatically transmits the file in the area indicated by the path in the client terminal 4 to the path in the virtual desktop environment. This further facilitates the file transfer on the client terminal 4 side compared with the file transfer in which a user specifies the path in the virtual desktop environment that is a destination of the file to be transferred every time when the user uses the virtual desktop environment. The control device 2A manages the path information in the client terminal 4 and the path information in the virtual desktop environment of the file to be uploaded by using the transfer correspondence table 211. This enables the control device 2A to upload the file to which an upload request is issued, to an appropriate area in the changed providing server 31 by using the transfer correspondence table 211 if the providing server 31 is changed to another providing server 31 every time the user uses the virtual desktop environment.

According to the second embodiment described above, the control device 2A controls the client terminal 4 to select the file to be uploaded to the providing server 31 out of the files in the associated information stored in the transfer correspondence table 211, and receives an upload request for the selected file. This enables the control device 2A to readily upload only the file used in the application at that time out of the files in the associated information stored in the transfer correspondence table 211, thereby improving transfer efficiency.

According to the second embodiment described above, the control device 2A receives an upload request for the file in the associated information different from the associated information stored in the transfer correspondence table 211. Subsequently, the control device 2A adds the path information in the client terminal 4 and the path information in the virtual desktop environment of the received file to the transfer correspondence table 211, and then transmits the added path information to the client terminal 4. The control device 2A controls the client terminal 4 to transfer the file to the providing server 31 according to a command generated from the transmitted path information and the IP address of the providing server 31 to which the client terminal 4 is coupled. With the configuration, the control device 2A manages an additional file desired to be uploaded on the client terminal 4 side, by using the transfer correspondence table 211. This enables the control device 2 to upload the file stored in an appropriate area in the providing server 31 that will be provided at a subsequent time when the virtual desktop environment is used next time. This facilitates the file transfer on the client terminal 4 side.

Computer Program

In the first embodiment, the transfer unit 222 causes the client terminal 4 to transfer the file to the providing server 31 according to a command generated from the path information in the client terminal 4, the path information in the providing server 31 of the file to be transferred, and the IP address of the providing server 31. For example, the client terminal 4 generates a file transfer command that specifies the path of transfer source and the path of transfer destination of the file for which the transfer request is issued, which has been transmitted from the transfer unit 222, and the IP address of the providing server 31; and executes the generated file transfer command. The transfer unit 222, however, is not limited to this example and may acquire the substance of the file from the path of transfer source in the client terminal 4 that has issued a transfer request, and load the acquired substance of the file to the path of transfer destination. In the second embodiment, the uploader 502 may acquire the substance of the file from the path of transfer source in the client terminal 4 that has issued an upload request, and load the acquired substance of the file to the path of transfer destination. With these configurations, the control device 2 and the control device 2A automatically transmit the file in the area indicated by the path in the client terminal 4 to the area indicated by the path in the providing server 31. This further facilitates the file transfer on the client terminal 4 side compared with the file transfer in which a user specifies the providing server 31 that is a destination of the file to be uploaded every time when the user uses the virtual desktop environment.

In the second embodiment, as for the screen layout of the transfer files list screen for download, the file in the transfer source s12 refers to the file name in the download destination in which the path of the download destination, that is, the path on the client terminal 4 side and the file name are combined with each other. Additionally, in the second embodiment, the directory of transfer destination s13 refers to the path of the download source, that is, the path on the providing server 31 side. These are, however, provided merely for exemplary purpose and not limiting. The transfer source s12 may display a file name in the transfer source in which the path of file transfer destination 211c and the file name 211b stored in the transfer correspondence table 211 are combined with each other. That is, the transfer source s12 may display information on the providing server 31 side serving as the download source. The directory of transfer destination s13 may display the path of file transfer source 211a stored in the transfer correspondence table 211. That is, the directory of transfer destination s13 may display information on the client terminal 4 side serving as the download destination. On this occasion, the control device 2A displays again the transfer files list screen on the virtual desktop environment on the monitor of the client terminal 4, triggered by the end of the application. The control device 2A here displays a file name in the transfer source in which the path of file transfer destination 211c and the file name 211b stored in the transfer correspondence table 211 are combined with each other in the transfer source s12 on the transfer files list screen. The control device 2A also displays the path of file transfer source 211a stored in the transfer correspondence table 211 in the directory of transfer destination s13 on the transfer files list screen.

The control device 2 and the control device 2A can be achieved by mounting the functions of the controlling unit 22 and the storage unit 21 described above on an information processing device such as an already-known personal computer and a workstation, for example.

Furthermore, the devices illustrated in the drawings is merely a depiction of concepts or functionality, and is not necessarily configured physically in the manner illustrated in the drawings. In other words, specific configurations in which each of the devices is distributed or integrated are not limited to those illustrated in the drawings. More specifically, the whole or a part of the devices may be distributed or integrated functionally or physically in any units depending on various loads or utilization. For example, the uploader 502 and the downloader 503 may be integrated into a single unit. By contrast, the uploader 502 may be distributed to a first uploader used when the transfer information exists in the transfer correspondence table 211, and a second uploader used when the transfer information is not present in the transfer correspondence table 211. The storage unit such as the transfer correspondence table 211 may be coupled as an external device to the control device 2A through the network 5.

Figure 11:
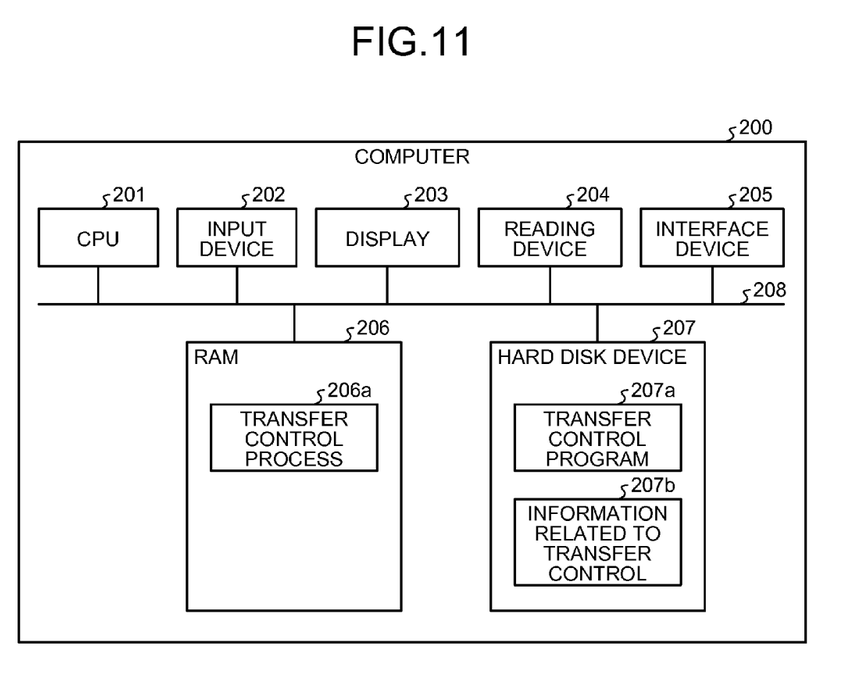
FIG. 11 is a diagram illustrating an example of a computer that executes a transfer control program.

The various types of processes described in the embodiments above can be achieved by a computer such as a personal computer and a workstation executing a computer program prepared in advance. The following describes, therefore, an example of a computer that executes a transfer control program achieving similar functions to the control device 2 illustrated in FIG. 1. FIG. 11 is a diagram illustrating an example of a computer that executes a transfer control program.

As illustrated in FIG. 11, a computer 200 includes a CPU 201 that executes various types of calculation processes; an input device 202 that receives data input from a user; and a display 203. The computer 200 also includes a reading device 204 that reads a computer program and the like from a recording medium; and an interface device 205 that exchanges data with other computers through the network 5. The computer 200 further includes a RAM 206 that temporarily stores various types of information; and a hard disk the device 207. The devices 201 to 207 are coupled to a bus 208.

The hard disk the device 207 stores therein a transfer control program 207a and information related to a transfer control 207b. The CPU 201 retrieves the transfer control program 207a and loads the program to the RAM 206. The transfer control program 207a functions as a transfer control process 206a.

For example, the transfer control process 206a corresponds to a connecting unit 221 and a transfer unit 222. The information related to transfer control 207b corresponds to the transfer correspondence table 211, the user information management table 212, an OS 213, and an application 214.

The transfer control program 207a is not necessarily stored in the hard disk the device 207 from the beginning. For example, the computer program may be stored in advance in a "portable physical medium" to be inserted into the computer 200, such as a flexible disk (FD), a compact disc read-only memory (CD-ROM), a digital versatile disc (DVD), an optical disc, and an integrated circuit (IC) card and the computer 200 may retrieve the transfer control program 207a from these media to execute the program.

One aspect of a transfer control program disclosed in the present application provides the advantageous effect of facilitating file transfer performed by a client for transferring a file the client has used to a server in a virtual desktop environment.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a transfer control process comprising:
   coupling a virtual machine that provides a virtual desktop environment to a client upon reception of a connection request from the client; and
   transferring data maintained in the client from the client to the virtual machine to which the client is coupled, according to correspondence information in which path information in the client by referring to a transfer correspondence table, the path information indicating a directory where data is maintained, the transfer correspondence table associating path information in the client terminal used by the client with path information in the virtual desktop environment for each file used by the client for executing the application in the virtual desktop environment, wherein
   upon reception of a transfer request for data represented by information different from the information associated with the correspondence information, the transferring includes adding path information in the client and path information in the virtual desktop environment of the received data to the correspondence information, transmitting the added path information to the client, and causing the client to transfer the data to the virtual machine to which the client is coupled according to a command generated from the transmitted path information and an address of the virtual machine to which the client is coupled.

2. The non-transitory computer-readable recording medium according to claim 1, wherein upon reception of a transfer request for data from the coupled client, the transferring includes transmitting to the client path information in the client and path information in the virtual desktop environment in the correspondence information for each piece of the data, and transferring the data from the client to the virtual machine to which the client is coupled according to a command generated from the transmitted path information and an address of the virtual machine to which the client is coupled.

3. The non-transitory computer-readable recording medium according to claim 2, wherein the transferring includes causing the client to select data to be transferred to the virtual machine to which the client is coupled out of the data represented by the information associated with the correspondence information and receiving a transfer request for the selected data.

4. The non-transitory computer-readable recording medium according to claim 1, wherein the transferring automatically transfers for each file used by the client for executing the application in the virtual desktop environment.

5. A control device comprising:
   a processor;
   a memory, wherein the processor executes:
   storing therein correspondence information in which path information in a client is associated with path information in a virtual desktop environment for each piece of data used by the client to execute an application in the virtual desktop environment, the path information indicating a directory where data is maintained;
   coupling a virtual machine that provides a virtual desktop environment to a client upon reception of a connection request from the client; and
   transferring data maintained in the client from the client to the virtual machine to which the client is coupled, according to correspondence information stored at the storing by referring to a transfer correspondence table, the transfer correspondence table associating path information in the client terminal used by the client with path information in the virtual desktop environment for each file used by the client for executing the application in the virtual desktop environment, wherein
   upon reception of a transfer request for data represented by information different from the information associated with the correspondence information, the transferring includes adding path information in the client and path information in the virtual desktop environment of the received data to the correspondence information, transmitting the added path information to the client, and causing the client to transfer the data to the virtual machine to which the client is coupled according to a command generated from the transmitted path information and an address of the virtual machine to which the client is coupled.

6. A method for transfer control executed by a computer, the method comprising:
   coupling a virtual machine that provides a virtual desktop environment to a client upon reception of a connection request from the client using a processor; and
   transferring data maintained in the client from the client to the virtual machine to which the client is coupled, according to correspondence information in which path information in the client by referring to a transfer correspondence table using the processor, the path information indicating a directory where data is maintained, the transfer correspondence table associating path information in the client terminal used by the client with path information in the virtual desktop environment for each file used by the client for executing the application in the virtual desktop environment, wherein
   upon reception of a transfer request for data represented by information different from the information associated with the correspondence information, the transferring includes adding path information in the client and path information in the virtual desktop environment of the received data to the correspondence information, transmitting the added path information to the client, and causing the client to transfer the data to the virtual machine to which the client is coupled according to a command generated from the transmitted path information and an address of the virtual machine to which the client is coupled.

7. The non-transitory computer-readable recording medium according to claim 1, wherein upon reception of a transfer request for data from the coupled client, the transferring transfers data receiving the transfer request according to correspondence information in which path information in the client is associated with path information in the virtual machine that provides the virtual desktop environment.

* * * * *